(12) United States Patent
Araki et al.

(10) Patent No.: US 7,689,301 B2
(45) Date of Patent: Mar. 30, 2010

(54) SAFETY CONTROL DEVICE, SAFETY CONTROL SYSTEM, AND METHOD FOR DETECTING COMMUNICATION ERROR

(75) Inventors: Tsutomu Araki, Osaka (JP); Hirofumi Kato, Osaka (JP); Sutemaro Kato, Osaka (JP); Michael Niehaus, Wettenberg (DE)

(73) Assignees: JTEKT Corporation, Osaka-shi (JP); Elan Schaltelemente GmbH & Co. KG, Wettenberg (DE)

( * ) Notice: Subject to any disclaimer, the term of this patent is extended or adjusted under 35 U.S.C. 154(b) by 168 days.

(21) Appl. No.: 11/668,258

(22) Filed: Jan. 29, 2007

(65) Prior Publication Data
US 2008/0021575 A1 Jan. 24, 2008

Related U.S. Application Data

(63) Continuation of application No. PCT/JP2005/013888, filed on Jul. 22, 2005.

(30) Foreign Application Priority Data

Jul. 29, 2004 (JP) ............................. 2004-222101

(51) Int. Cl.
G06F 19/00 (2006.01)
(52) U.S. Cl. ........................................ 700/81; 714/781
(58) Field of Classification Search ................... 700/81, 700/1, 12, 20, 275, 17, 26, 21; 714/781, 714/757, 775, 772, 755, 798, 807; 712/234; 360/40; 701/23, 1, 2, 45, 33, 36, 50; 340/426.11, 340/500, 679, 680; 250/222.1
See application file for complete search history.

(56) References Cited

U.S. PATENT DOCUMENTS

| | | | | |
|---|---|---|---|---|
| 3,735,353 A * | 5/1973 | Donovan et al. | ........ | 340/825.37 |
| 5,229,999 A * | 7/1993 | Cushing et al. | ............. | 714/703 |
| 5,822,331 A * | 10/1998 | Ugawa et al. | ................ | 714/704 |
| 6,404,804 B1 * | 6/2002 | Mannering et al. | .......... | 375/222 |
| 6,404,805 B1 * | 6/2002 | Ohtani et al. | ................ | 375/222 |
| 6,480,873 B1 * | 11/2002 | Inoue et al. | ................ | 708/606 |
| 6,557,138 B1 * | 4/2003 | Modelli | ...................... | 714/753 |
| 6,778,079 B2 * | 8/2004 | Weber | ........................ | 340/500 |
| 7,320,101 B1 * | 1/2008 | Bain | ........................... | 714/781 |
| 7,499,774 B2 * | 3/2009 | Barrett et al. | .................. | 701/23 |
| 2002/0047774 A1 * | 4/2002 | Christensen et al. | ....... | 340/3.54 |
| 2004/0230323 A1 * | 11/2004 | Glanzer et al. | ................ | 700/18 |
| 2007/0192667 A1 * | 8/2007 | Nieto et al. | .................. | 714/780 |

FOREIGN PATENT DOCUMENTS

| | | |
|---|---|---|
| JP | 2-291739 | 12/1990 |
| JP | 04-241547 | 8/1992 |
| JP | 9-319411 | 12/1997 |
| JP | 2000-165424 | 6/2000 |

\* cited by examiner

*Primary Examiner*—Kidest Bahta
(74) *Attorney, Agent, or Firm*—Oblon, Spivak, McClelland, Maier & Neustadt, L.L.P.

(57) ABSTRACT

A safety control device for ensuring safety of an object to be controlled, including: communication unit which is used for communication with another safety control device and uses a frame including a test bit string T having correlation with a base bit string B; and detection unit which compares with the base bit string B the test bit string T included in a frame having been received from another safety control device, thereby determining the number of bit errors in the frame.

12 Claims, 4 Drawing Sheets

SAFETY CONTROL DEVICE, SAFETY CONTROL SYSTEM, AND METHOD FOR DETECTING COMMUNICATION ERROR

CROSS REFERENCE TO RELATED APPLICATIONS

This application contains subject matter related to Japanese and International applications JP2004-221736, JP2004-222101, PCT/JP2005/013888 and PCT/JP2005/013889, the entire contents of which being incorporated herein by reference in their entirety. Priority applications PCT/JP2005/013888 and JP2004-222101 were filed on Jul. 22, 2005 and Jul. 29, 2004 respectively.

TECHNICAL FIELD

The present invention relates to a technique for detecting a communication error between safety control devices which ensure safety of an object to be controlled.

BACKGROUND ART

Conventionally, control apparatuses, such as programmable controllers (PLCs), have been employed in factory automation (FA) for controlling mechanical devices. In recent years, such a control apparatus is desired to have a safety function of stopping a mechanical device when an anomaly occurs, to thus ensure safety. Hence, safety control devices equipped with such a safety function have been proposed (see, e.g., JP-A-2002-358106).

In FA, a plurality of control apparatuses are connected by way of communication lines and form a network system, to thus perform simultaneous control of a plurality of mechanical devices. Hence, a communication error which arises between safety control devices must be detected accurately for enhancing the reliability of the safety function.

Meanwhile, among safety control devices forming a network system as described above, communication is carried out with use of frames in accordance with, e.g., the high-level data link control (HDLC) protocol. During the course of communication, a communication error is detected by a parity check or by a cyclic redundancy check (CRC), and corrected.

DISCLOSURE OF THE INVENTION

The related-art parity check or the CRC can detect presence/absence of a bit error in a frame/however, the number of bits with errors cannot be detected. Accordingly, the number of bit errors which have occurred in a predetermined period of time cannot be determined accurately. This causes a bottleneck in enhancing the reliability of the safety function.

The present invention has been conceived in view of the above problem, and aims at providing a safety control device whose safety function is highly reliable, as well as a safety control system.

The invention also aims at providing a method for detecting a communication error which can enhance reliability of a safety function provided by a safety control device.

The invention defined in originally filed claim 1 is a safety control device for ensuring safety of an object to be controlled, including: a communication unit which is used for communication with another safety control device and uses a frame including a test bit string having correlation with a base bit string; and a detection unit which compares the test bit string included in the frame having been received from another safety control device with the base bit string, thereby determining the number of bit errors in the frame. In the invention, the test bit string has correlation with the base bit string. Accordingly, when the test bit string included in a frame having been received from another safety control device is compared with the base bit string in consideration of the correlation, the number of bit errors in the received frame can be determined accurately. Hence, since communication errors are detected accurately, reliability of a safety function for ensuring safety of an object to be controlled can be enhanced.

According to the invention defined in originally filed claims 2 and 4, at least a portion of the test bit string is a copied bit string of the base bit string. Accordingly, the number of bit errors can be determined easily by means of merely performing bit comparison between the base bit string and the copied bit string of the test bit string included in the received frame. Hence, a time required for comparing the test bit string with the base bit string for determining the number of bit errors is reduced.

When an error due to a stack out, in which a certain bit is fixed to "0" or "1," has arisen in a copied bit string of a test bit string included in a received frame, detection of the bit error itself through bit comparison between the copied bit string and a base bit string sometimes fails.

According to the invention defined in originally filed claims 3 and 4, at least a portion of the test bit string is a reversed bit string of the base bit string. Therefore, even when an error due to a stack out has occurred in the bit string of the reversed bit string of the test portion included in the received frame, the error can be detected without fail by means of bit comparison between a re-reversed bit string—which is a re-inversion of the reversed bit string—with the base bit string. Therefore, the number of bit errors can be accurately determined.

Even when a bit error has occurred in a test bit string in a received frame, there may be a case where no change arises in the correlation between the test bit string and a base bit string. In this case, detecting the bit error through comparison between the test bit string and the base bit string becomes impossible.

According to the invention defined in originally filed claim 5, the base bit string and the test string vary with time while maintaining mutual correlation. Accordingly, even when detection of a bit error has failed at a certain point in time, the bit error can be detected by means of comparison between a base bit string and a test bit string, each of which has varied with time after the failure. Therefore, accuracy in determination of the number of bit errors can be enhanced.

According to the invention defined in originally filed claim 6, the frame includes the base bit string and the test bit string. Accordingly, the base bit string can be used in common among safety control devices which carry out communication, irrespective of time-varying changes in the base bit string. In addition, in such a case where an additional safety control device is to be connected to a system which is configured such that a plurality of safety control devices are connected together, a base bit string which is common to all the safety control devices can be embodied.

The invention defined in originally filed claim 7 further includes counting unit for incrementing a count value every configured cycle. The base bit string indicates the count value of the counting unit. Accordingly, the base bit string varies every configured cycle, whereby the test bit string having correlation with the base bit string also varies every configured cycle. Hence, comparison between the base bit string and the test bit string, which vary with time while maintaining mutual correlation, can be attained by means of a comparatively simple method.

The invention defined in originally filed claim 8 further includes storage unit for storing an accumulated value of the number of bit errors detected by the detection unit. Accordingly, the number of bit errors having occurred within, e.g., a predetermined period of time, can be determined accurately.

The inventions defined in originally filed claims 9 and 10 further include safety-ensuring unit which performs, when the accumulated value of the number of bit errors within a set period of time exceeds an allowable value, control for ensuring safety of the object to be controlled. Accordingly, when bit errors occur in a number exceeding the allowable value, safety of the object to be controlled can be ensured instantaneously, whereby the reliability of the safety function can be ensured. The invention defined in originally filed claim 11 is a safety control system configured such that a plurality of safety control devices defined in any one of originally filed claims 1 to 10 are connected by way of communication lines. Accordingly, effects of the safety control device defined in any one of originally filed claims 1 to 10 constituting the safety control system can be yielded.

The invention defined in originally filed claim 12 is a method by means of which a safety control device for ensuring safety of an object to be controlled detects an error in communication with another safety control device, including: a receiving step of receiving, from another safety control device, a frame including a test bit string having correlation with a base bit string; and a detection step of comparing with the base bit string the test bit string included in the frame having been received in the receiving step, thereby determining the number of bit errors in the frame. In the invention, the test bit string has correlation with the base bit string. Accordingly, when the test bit string included in the frame having been received from another safety control device is compared with the base bit string in consideration of the correlation, the number of bit errors in the received frame can be determined accurately. Hence, since a communication error is detected accurately, the reliability of a safety function for ensuring safety of an object to be controlled can be enhanced.

The invention defined in originally filed claim 13 is a method for detecting a communication error among a plurality of safety control devices for ensuring safety of an object to be controlled, including: a generation step of, in a first safety control device, generating a frame so that the frame includes a test bit string having correlation with a base bit string; a transmission step of transmitting to a second safety control device the frame generated by the first safety control device; and a detection step of, in the second safety control device, comparing with the base bit string the test bit string included in the frame having been received from the first safety control device, thereby determining the number of bit errors in the frame. In the invention, the test bit string has correlation with the base bit string. Accordingly, when, in the second safety control device, the test bit string included in the frame having been received from the first safety control device is compared with the base bit string in consideration of the correlation, the number of bit errors in the received frame can be determined accurately. Hence, since a communication error is detected accurately, the safety function for ensuring safety of an object to be controlled can be provided more reliably.

Meanwhile, in the inventions defined in originally filed claims 1 to 13, the term "bit string" is to be understood as encompassing data of one bit in addition to data whose bit length is two or larger.

In addition, the invention defined in originally filed claim 13 may be practiced such that at least one of a plurality of safety control devices is selected as the first safety control device, and at least another one of the same is selected as the second safety control device. In this case, the apparatuses selected as the first safety control device and as the second safety control device may be sequentially replaced with lapse of time.

BRIEF DESCRIPTION OF THE DRAWING

In the accompanying drawings.

BEST MODE FOR CARRYING OUT THE INVENTION

Hereinbelow, an embodiment of the present invention will be described by reference to the drawings.

Figure 2:
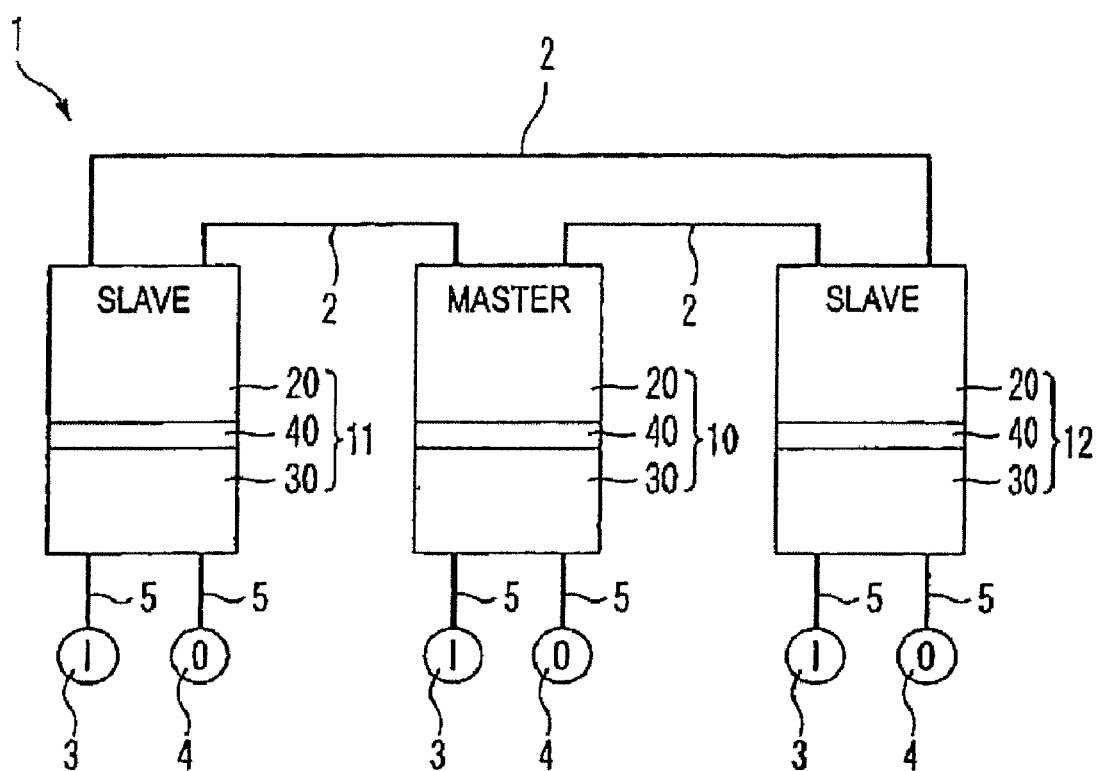
FIG. 2 is a block diagram showing a safety control system according to the embodiment of the invention/

FIG. 2 shows a safety control system 1 according to an embodiment of the invention. The safety control system 1 is a network system configured such that a plurality of safety control devices are connected in a ring connection by way of communication lines 2, such as optical fiber cables. Meanwhile, the maximum number of safety control devices connected in the safety control system 1 of the embodiment is set to 24. However, for convenience of explanation, the following description is based on an assumption that three safety control devices are connected therein.

In the safety control system 1, the safety control device denoted with reference numeral 10 functions as a master device, and the remaining safety control devices denoted with reference numerals 11 and 12 function as slave devices. An input device 3, such as an emergency button or a safety sensor, and an output device 4, such as a motor or a robot, are connected to each of the safety control devices 10 to 12 by way of communication lines 5. By means of cooperative operation of the respective safety control devices 10 to 12, the safety control system 1 controls the respective output devices 4 on the basis of input data supplied from the respective input devices 3, thereby ensuring safety of the respective output devices 4.

Figure 3:
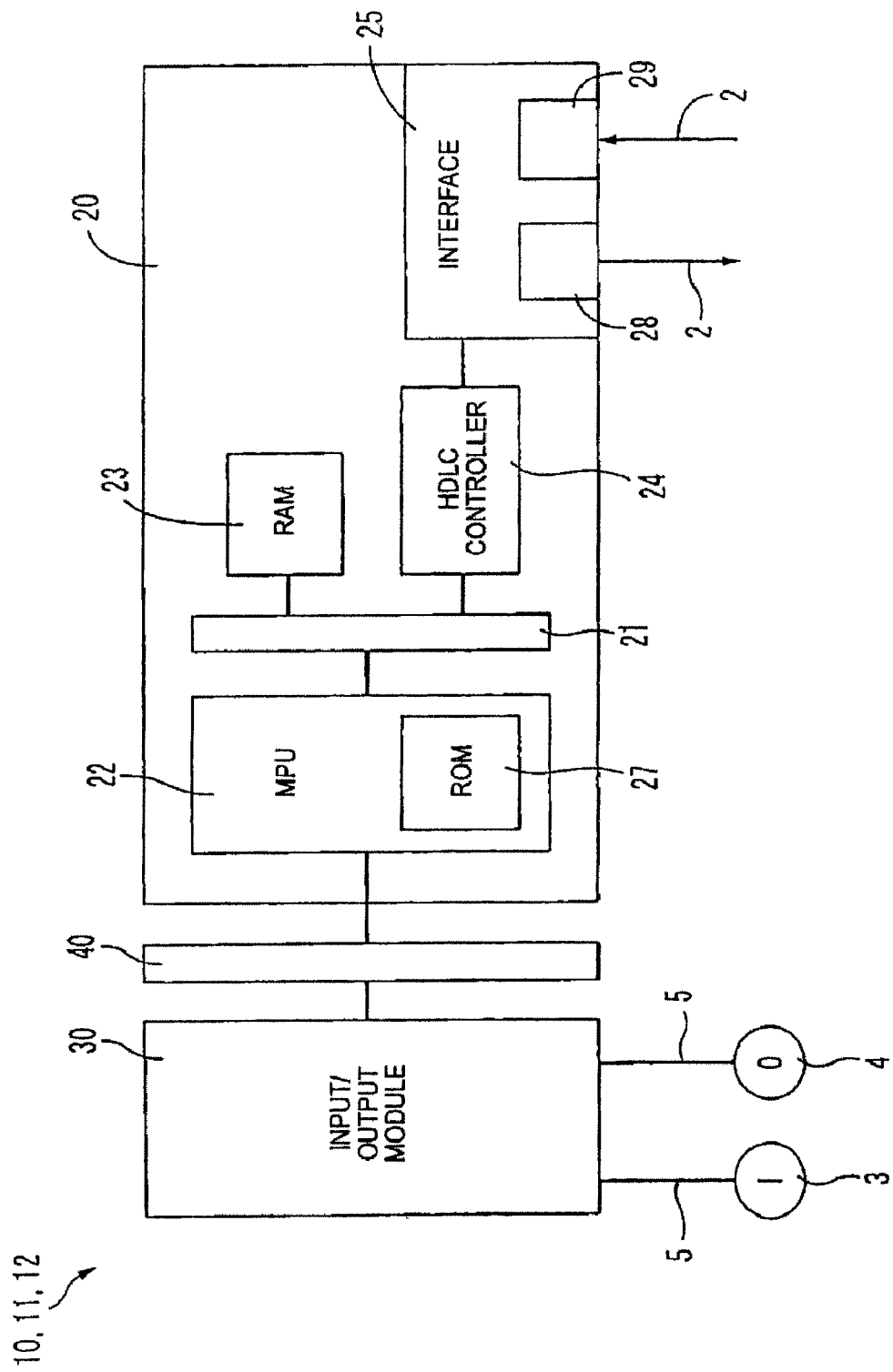
FIG. 3 is a block diagram showing a safety control device according to the embodiment of the invention.

As shown in FIGS. 2 and 3, each of the safety control devices 10 to 12 includes a communication module 20, an input/output module 30, and a bus module 40.

As shown in FIG. 3, the communication module 20 includes an MPU 22, RAM 23, and an HDLC controller 24, which are connected with each other by way of an internal bus 21; and an interface 25 connected to the HDLC controller 24. The MPU 22 is connected to the input/output module 30 by way of the bus module 40. The MPU 22, which has ROM 27, executes a program stored in the ROM 27, thereby controlling the HDLC controller 24 and the input/output module 30. In particular, the ROM 27 in the safety control device 10 stores a sequence program written in a ladder language. The MPU 22 of the safety control device 10 executes the sequence program, thereby controlling the entire safety control system 1. More specifically, the safety control device 10 can be considered a programmable controller (PLC); and the safety control system 1 including the same can be said to be a PLC system. In the RAM 23, a variety of data—such as a count value and the number of bit errors—exchanged between the MPU 22 and the HDLC controller 24, and between the MPU 22 and the input/output module 30 are stored sequentially.

The interface 25 has an output connector 28 and an input connector 29. The output connector 28 is connected, by way of a communication line 2, to one of the other two safety control devices other than that on which the output connector 28 is disposed. The input connector 29 is connected to the other one of the safety control devices by way of another communication line 2.

The HDLC controller 24 generates a frame in conformance with the HDLC protocol, and transmits the thus-generated frame to a safety control device-connected to the output connector 28. The HDLC controller 24 analyze and processes, among frames received from a safety control device connected with the input connector 29, a frame which includes a portion indicating the safety control device on which the HDLC controller 24 is disposed as the destination of the frame. By means of utilizing a result of this analysis, the HDLC controller 24 processes a communication error. In addition, the HDLC controller 24 transmits to the safety control device connected with the output connector 28, among the received frames, a frame which includes, as the destination of the frame, a safety control device other than the safety control device equipped with the HDLC controller 24.

The input/output module 30 is connected to the input device 3 and the output device 4 by way of the communication lines 5. Upon receipt of a command from the MPU 22 connected by way of the bus module 40, the input/output module 30 supplies to the MPU 22 data pertaining to the input device 3. Upon receipt of a command from the MPU 22, the input/output module 30 powers-on/powers-off the output device 4.

In the safety control system 1 configured as above, the MPU 22 of the safety control device 10 manages communication of the entire safety control system 1 in accordance with the sequence program of the ROM 27. Under this management, the respective safety control devices 10 to 12 carry out communication with use of frames, in a predetermined order per cycle.

Heretofore, an overview of the safety control system 1 has been described.

Hereinbelow, features of the safety control system 1 will be described in more detail.

First, a frame for use in communication among the respective safety control devices 10 to 12 will be described in detail.

Figure 1:
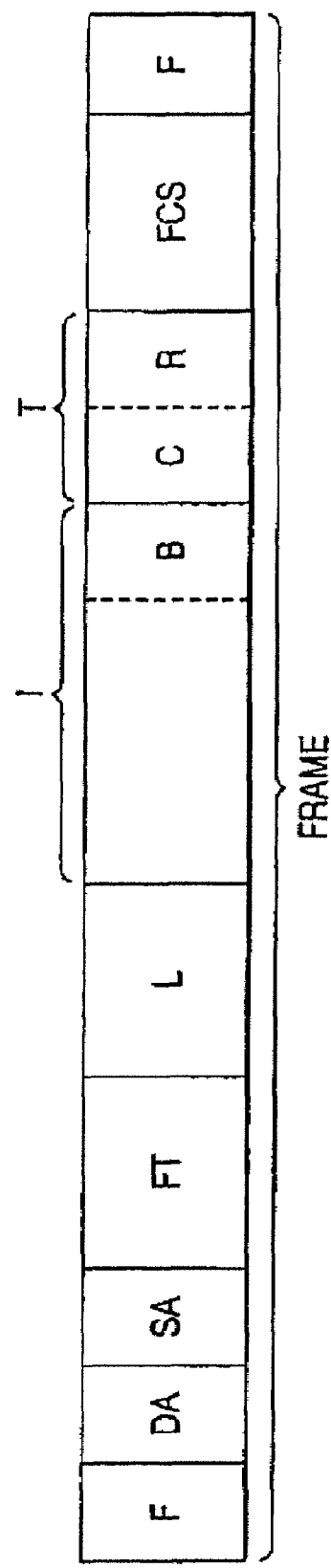
FIG. 1 is a schematic view for explaining a frame for use in an embodiment of the present invention.

As schematically shown in FIG. 1, the frame includes two flag sequences F; a destination address portion DA; a source address portion SA; a frame-type portion FT; a bit length portion L; an information portion I; a test portion T; and a frame check sequence FCS.

The flag sequence F is a bit string of one byte, and defined as "01111110" in the HDLC protocol. The destination address portion DA is a bit string of one byte indicating an address of a safety control device serving as the destination of the frame. The source address portion SA is a bit string of one byte indicating an address of a safety control device serving as the source of the frame. The frame-type portion FT is a bit string of two bytes indicating a frame type defined by a combination of: a command description for the destination of the frame, a serial number of the frame, information pertaining to occurrence of a serial failure, and the like. The bit length portion L is a bit string of two bytes indicating a total bit length of the information portion I and the test portion T.

The information portion I is a bit string of one byte or larger which indicates a plurality of control data sets to be supplied to the destination of the frame. In the present embodiment, the last one byte of the information portion I is a base bit string B which indicates, among control data sets to be supplied to the destination of the frame, a count value stored in the RAM 23 of the source of the frame. The test portion T is a test bit string of two bytes, and includes a copied bit string C, which is a copy of the base bit string B/ and a reversed bit string R, which is an inversion of the base bit string B. The frame check sequence FCS is a bit string of two bytes indicating data for the CRC.

Next, generation of a frame by the HDLC controller 24 of one of the safety control devices 10 to 12 will be described.

Upon receipt of a command from the MPU 22, the HDLC controller 24 in the safety control device 10, 11, or 12 executes frame-generation processing. More specifically, the HDLC controller 24 generates the destination address portion DA, the source address portion SA, and the frame-type portion FT so as to respectively indicate a destination address, a source address, and a frame type supplied from the MPU 22.

In addition, the HDLC controller 24 generates the base bit string B so that the base bit string B indicates a count value of the RAM 23 at a start time of processing. The thus-generated base bit string B is merged with a bit string indicating control data supplied from the MPU 22, thereby generating the information portion I. Simultaneously, the HDLC controller 24 generates the copied bit string C, which is a copy of the base bit string B, and the reversed bit string R, which is an inversion of the base bit string B, thereby generating the test portion T constituted of the bit strings C and R. Furthermore, the HDLC controller 24 generates the bit length portion L from the thus-generated information portion I and the test portion T.

Still furthermore, the HDLC 24 generates the frame check sequence FCS from the thus-generated respective portions DA, SA, FT, I, T, and L.

Next, analysis of a frame by the HDLC controller 24 of each of the safety control devices 10 to 12 will be described.

Upon receipt of a frame to be analyzed, the HDLC controller 24 in the corresponding one of the safety control device 10 to 12 executes frame-analysis processing. More specifically, the HDLC controller 24 extracts a frame type from the frame-type portion FT of the frame to be analyzed, and supplies the thus-extracted frame type to the MPU 22. In addition, the HDLC controller 24 extracts data for the CRC from the frame check sequence FCS of the frame to be analyzed, and executes the CRC by utilization of the thus-extracted data.

Furthermore, the HDLC controller 24 extracts the copied bit string C and the reversed bit string R from the test portion T of the frame to be analyzed, and supplies the MPU 22 with the thus-extracted bit strings C and R. Simultaneously, the HDLC controller 24 extracts the base bit string B from the information portion I of the frame to be analyzed, and supplies the MPU 22 with the thus-extracted base bit string B.

Figure 4:
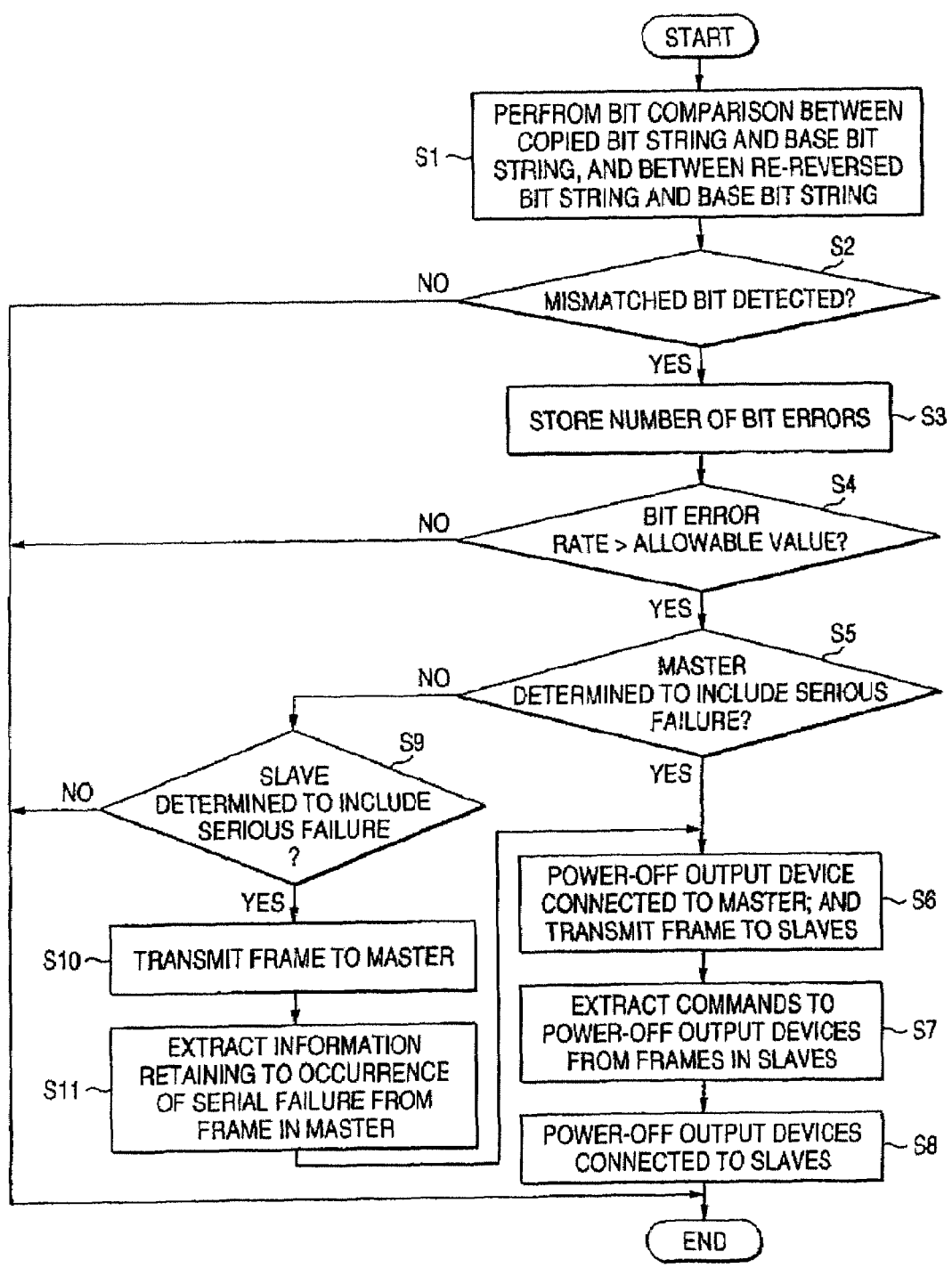
FIG. 4 is a flowchart for describing processing of a communication error according to the embodiment of the present invention.

Next, a method for processing a communication error executed by the safety control devices 10 to 12 will be described by reference to a flowchart shown in FIG. 4. In FIG. 4, the safety control device 10 is denoted as a master device, and the safety control devices 11 and 12 are denoted as slave devices.

In each of the safety control device 10 to 12, when the bit strings C, R, and B are supplied from the HDLC controller 24, the MPU 22 executes processing of a communication error. More specifically, the MPU 22 performs bit comparison between the copied bit string C and the base bit string B, sequentially from the highest order bit or from the lowest order bit. Simultaneously, the MPU 22 performs bit comparison between a re-reversed bit string R', which is a re-inversion of the reversed bit string R, and the base bit string B, sequentially from the highest order bit or from the lowest order bit (step S1). When, consequently, a bit which fails to match at least one of the bit strings C and R' is detected in the reference bit B (step S2), the MPU 22 stores the cumulative number of the thus-detected bits in the RAM 23 as the number of bit errors (step S3). This storage of the number of bit errors into the RAM 23 is performed in such a manner as to add the number of error bits onto the number of bit errors having been stored in advance. Meanwhile, the MPU 22 also has a function of updating the number of bit errors stored in the RAM 23 every set period of time. Accordingly, the number of bit errors stored in the RAM 23 is an accumulated value within the set period of time. As described above, the MPU 22 monitors the number of bit errors stored in the RAM 23. When the accumulated value of the number of bit errors in the set time; that is, a bit error rate, exceeds an allowable value (step S4), the MPU 22 determines that a serious failure has occurred (step S5 and S9).

When the MPU 22 of the safety control device 10 determines that a serious failure has occurred (step S5), the MPU 22 powers off the output device 4 connected to the input/output module 30 of the same safety control device 10 (step S[beta]). In conjunction therewith, the MPU 22 of the safety control device 10 causes the HDLC controller 24 to generate and transmit frames including the frame-type portion FT which indicates a frame type commanding power-off of the output devices 4, and the destination address portion DA whose destination addresses are the safety control devices 11 and 12 (step S6). Consequently, in each of the safety control devices 11 and 12 which has received the frame, the command to power-off the output device 4 is extracted from the frame-type portion FT and supplied to the MPU 22 in accordance with an analysis performed by the HDLC controller 24 (step S7). The MPU 22 powers-off the output device 4 connected to the input/output module 30 (step S8).

When the MPU 22 determines that a serious failure has occurred in the safety control device 11 or 12 (step S9), the MPU 22 causes the HDLC controller 24 to generate and transmit a frame including the frame-type portion FT which indicates a frame type indicating occurrence of the serious failure, and the destination address portion DA whose destination address is the safety control device 10 (step S10). Consequently, in the safety control device 10 which has received the frame, data pertaining to occurrence of the serious failure is extracted from the frame-type portion FT and supplied to the MPU 22 in accordance with analysis performed by the HDLC controller 24 (step S11). The same processing as in the case where the MPU 22 has determined that a serious failure has occurred is executed (steps S6 to 8). Therefore, all the output devices 4 connected to the input/output modules 30 of the respective safety control devices 10 to 12 are powered-off.

As described above, the HDLC controllers 24 of the respective safety control devices 10 to 12 correspond to communication unit; the MPUs 22 of the same correspond to detection unit and safety-ensuring unit; and pieces of RAM 23 and the MPUs 22 correspond to storage unit.

Next, storage of a count value in the RAM 23 of each the safety control devices 10 to 12 will be described.

In the safety control device 10, the MPU 22 increments a count value of the RAM 23 every time the MPU 22 starts one communication cycle.

In each of the safety control devices 11 and 12, the HDLC controller 24 performs analysis of the information portion I of the frame to be analyzed having been received from the safety control device 10 as described above, thereby extracting the base bit string B. The MPU 22 stores in the RAM 23 a count value indicated by the thus-extracted base bit string B. Accordingly, count values to be stored in the pieces of RAM 23 of the safety control devices 11 and 12 are basically those having been incremented every configured cycle.

Thus, the MPUs 22 of the respective safety control devices 10 to 12 correspond to counting unit. The process of steps S1-5 and S9 corresponds to a method for detecting an error according to the present invention.

The above-described safety control system 1 uses a frame including the test portion T formed from the copied bit string C of the base bit string B, and the reversed bit string R of the base bit string B during the course of communication among the respective safety control devices 10 to 12. Accordingly, each of the safety control devices 10 to 12 performs bit comparison between the copied bit string C of the test portion T of a received frame and the base bit string B, thereby attaining immediate determination of the number of bit errors having occurred in the frame. In addition, even when a bit error due to a stack out has occurred in the bit string C of the test portion T of the received frame, to thus hinder detection of the number of errors by means of bit comparison between the copied bit string C and the base bit string B, determination of the number of bit errors can be attained by means of performing bit comparison between the re-reversed bit string R' of the reversed bit string R and the base bit string B. As described above, each of the safety control devices 10 to 12 compares the respective bit strings C and R of the test portion T included in a received frame in accordance with correlation with respect to the base bit string B, thereby attaining accurate detection of the number of bit errors included in the frame.

Furthermore, each of the safety control devices 10 to 12 of the safety control system 1 generates a base bit string B of the frame so that the reference bit B indicates a count value to be incremented every configured cycle. Therefore, the base bit string B varies with time; and accordingly, the test portion T generated from the copied bit string C of the base bit string B, and the reversed bit string R of the base bit string B also vary with time while maintaining correlation with the base bit string B. Hence, in such a case where, in spite of occurrence of a bit error in the bit strings C and R of the test portion T in the received frame, at a certain point in time, correlation between the bit string C and the base bit string B, or that between the bit string R and the base bit string B, does not exhibit any change, whereby error detection is prevented, the error can be detected by means of comparing a base bit string B which has subsequently varied with time, and respective bit strings C and R which have also varied with time. In other words, accuracy in determination of the number of bit errors is enhanced.

Furthermore, according to the safety control system 1, when any one of the safety control devices 10 to 12 determines occurrence of such a serious failure that the accumulated value of the number of bit errors in a set period of time exceeds an allowable value, all the output devices 4 connected to the respective safety control devices 10 to 12 are powered-off. Accordingly, safety of all the output devices 4 to be controlled is secured instantaneously.

As described above, according to the safety control system 1, accuracy in determination of the number of bit errors which represents communication errors is improved; and, furthermore, safety of all the output devices 4 can be secured instantaneously by utilization of the result of the detection. Hence, high reliability of safety function can be ensured.

Moreover, a frame including the base bit string B, in addition to the test portion T, is utilized in communication among the respective safety control devices 10 to 12 of the safety control system 1. Accordingly, the base bit string B which varies with time as described above can be used in common by all the safety control devices 10 to 12. In addition, in such a case where another safety control device of similar configuration with the safety control device 11 or 12 is to be additionally connected to the safety control system 1 shown in FIG. 2, a base bit string B which is common to all the safety control devices can be embodied without interrupting processing before connection.

Hithertofore, an embodiment of the present invention has been described; however, the present invention should not be understood to be limited to the embodiment. For instance, in the above-described embodiment, the single input device 3 and the single output device 4 are connected to each of the safety control devices 10 to 12 respectively. However, the number of input devices and output devices to be connected to the safety control device can be set arbitrarily.

In addition, in the embodiment, of the safety control devices 10 to 12, only the safety control device 10 functioning as a master device is configured as a PLC. However, the safety control device functioning as a slave device may also be configured as a PLC.

Furthermore, in the above-mentioned embodiment, the communication module 20 and the input/output module 30 of each of the safety control devices 10 to 12 are configured as separate modules connected by way of the bus module 40. However, such a communication module and an input/output module may be configured as a single module.

Still furthermore, in the embodiment, the test portion T serving as a test bit string is formed from a copied bit string C of the base bit string B, and the reversed bit string R of the base bit string B. For instance, however, the test portion T may be formed from only one of the copied bit string C and the reversed bit string R. Alternatively, the test portion T may be configured such that the test portion T is formed from only the copied bit string C at a certain point in time, and the same is formed from only the reversed bit string R at another point in time. Even when a bit string which constitutes the test portion T is formed so as to vary with lapse of time, the test portion T can be embodied by means of a comparatively easy method.

INDUSTRIAL APPLICABILITY

As described above, according to the invention, there is provided a safety control device whose safety function is highly reliable, as well as a safety control system. The invention also provides a method for detecting a communication error which can enhance reliability of a safety function provided by a safety control device.

The invention claimed is:

1. A safety control device for ensuring safety of an object to be controlled, comprising:
a controller that generates a base bit string;
a communication unit that receives, from another safety control device, a frame including a base bit string and a test bit string having correlation with the base bit string, and communicates the frame including the test bit string having correlation with the base bit string from the another safety control device; and
a detection unit that compares the test bit string included in the frame received from the another safety control device with the base bit string included in the received frame, and detects a number of bit errors in the frame.

2. The safety control device according to claim 1, wherein at least a portion of the test bit string is a copied bit string copied from the base bit string.

3. The safety control device according to either one of claim 1 or claim 2, wherein at least a portion of the test bit string is a reversed bit string reversed from the base bit string.

4. The safety control device according to claim 1, wherein the test bit string includes:
a copied bit string copied from the base bit string; and
a reversed bit string reversed from the base bit string.

5. The safety control device according to claim 1, wherein the base bit string and the test string vary with time while maintaining mutual correlation.

6. The safety control device according to claim 1, further comprising:
a counting unit that increments a count value every configured cycle, wherein the base bit string indicates the count value.

7. The safety control device according to claim 1, further comprising:
a storage unit that stores an accumulated value of the number of bit errors determined by the detection unit.

8. The safety control device according to claim 7, further comprising:
a safety-ensuring unit that performs, when the accumulated value within a set period of time exceeds an allowable value, a control for ensuring safety of the object to be controlled.

9. The safety control device according to claim 8, wherein the storage unit updates the accumulated value every the set period of time.

10. A safety control system comprising:
a plurality of safety control devices for ensuring safety of objects to be controlled; and
a communication line that connects the safety control devices with each other,
wherein each of the safety control devices comprises:
a controller unit that generates a base bit string;
a communication unit that receives, from another safety control device, a frame including a base bit string and a test bit string having correlation with the base bit string, and communicates the frame including the test bit string having correlation with the base bit string from at least another one of the safety control devices through the communication line; and
a detection unit that compares the test bit string included in the frame received from the another safety control device with the base bit string included in the received frame, and determines a number of bit errors in the frame.

11. A method for detecting an error in communication between safety control devices that ensures safety of an object to be controlled, the method comprising:
generating a base bit string in one safety control device;
receiving by one of the safety control devices from another of the safety control devices a frame including the base bit string and a test bit string having correlation with the base bit string; and
detecting a number of bit errors in the frame by comparing the test bit string included in the frame received from the another safety control device with the base bit string included in the received frame.

12. A method for detecting an error in communication between safety control devices that ensures safety of an object to be controlled, the method comprising:
generating, in a first safety control device, a frame including a base bit string and a test bit string having correlation with the base bit string;
transmitting the frame generated in the first safety control device from the first safety control device to the second safety control device; and
detecting, in the second safety control device, a number of bit errors in the frame by comparing the base bit string included in the received frame with the test bit string included in the received frame.

* * * * *